United States Patent
Zharkov et al.

(10) Patent No.: US 8,142,726 B2
(45) Date of Patent: Mar. 27, 2012

(54) COOL OXYGEN CHEMICAL GAS GENERATOR

(75) Inventors: Alexandr Sergeevich Zharkov, Biysk (RU); Vladimir Alekseevich Shandakov, Biysk (RU); Leonid Alexandrovich Pilyugin, Biysk (RU); Ronald Peter van den Berg, The Hague (NL)

(73) Assignee: Nederlandse Organisatie Voor Toegepast-Natuurwetenschappeluk Onderzoek Tno, Delft (NL)

( * ) Notice: Subject to any disclaimer, the term of this patent is extended or adjusted under 35 U.S.C. 154(b) by 1110 days.

(21) Appl. No.: 10/485,033
(22) PCT Filed: Jul. 25, 2002
(86) PCT No.: PCT/NL02/00506
§ 371 (c)(1),
(2), (4) Date: Jun. 25, 2004

(87) PCT Pub. No.: WO03/009899
PCT Pub. Date: Feb. 6, 2003

(65) Prior Publication Data
US 2005/0053527 A1    Mar. 10, 2005

(30) Foreign Application Priority Data

Jul. 26, 2001 (RU) ................................. 2001121023

(51) Int. Cl.
| | |
|---|---|
| *A62B 7/08* | (2006.01) |
| *B01J 15/00* | (2006.01) |
| *A61L 9/00* | (2006.01) |
| *C06B 45/00* | (2006.01) |
| *F24B 4/00* | (2006.01) |
| *B60R 21/16* | (2006.01) |

(52) U.S. Cl. ........ 422/126; 422/120; 422/164; 422/165; 422/167; 422/305; 102/530; 102/200; 102/283; 102/335; 280/728.1; 280/DIG. 7

(58) Field of Classification Search ........... 422/120, 422/126, 164–165, 167, 305; 102/530, 200, 102/283, 335; 280/728.1, DIG. 7
See application file for complete search history.

(56) References Cited

U.S. PATENT DOCUMENTS 2,558,756 A * 7/1951 Jackson et al. ................. 422/120
(Continued)

FOREIGN PATENT DOCUMENTS
FR    1 099 904 A    9/1955

OTHER PUBLICATIONS

Shandakov, V. A., et al., Cold Gas Generators Multiple Use in Hazardous Situations, Chemical Abstracts + Indexes, American Chemical Society. Columbus, US, vol. 132, No. 7, Feb. 14, 2000, XP002140538.

(Continued)

*Primary Examiner* — Jill Warden
*Assistant Examiner* — Monzer Chorbaji
(74) *Attorney, Agent, or Firm* — Lucas & Mercanti, LLP

(57) ABSTRACT

The present invention is directed to a chemical oxygen generator to produce cool oxygen gas comprising: a. a charge housing, b. a solid but porous charge contained in the said housing, the charge being made of a chemical mixture that generates oxygen upon decomposition and that will undergo a self-sustained exothermal decomposition after initiation, the said charge containing at most 3.0 wt. % of binder material, the said porous charge allows the generated oxygen to pass through the charge without damaging the virgin material and without creating volumetric burning, the said charge is mounted in the housing in such a way that the generated oxygen passes through the charge and under the pressure difference flows from the moving decomposition front towards the vent, c. an ignition device mounted at one end of the cartridge in such a way that it is capable to initiate a self-sustained decomposition of the charge at the charge surface adjacent to the initiator, d. one or more vents mounted in such a way that the generated oxygen that has passed through the generating porous charge leave the gas generator through the said vents.

24 Claims, 1 Drawing Sheet

U.S. PATENT DOCUMENTS

| | | | |
|---|---|---|---|
| 3,458,288 A * | 7/1969 | Lafyatis et al. | 422/113 |
| 3,542,522 A * | 11/1970 | Mausteller | 422/122 |
| 3,736,104 A * | 5/1973 | Churchill et al. | 422/120 |
| 3,749,678 A * | 7/1973 | Thompson | 252/186.21 |
| 3,797,854 A | 3/1974 | Poole et al. | 280/150 |
| 4,840,171 A * | 6/1989 | Rohling et al. | 128/204.18 |
| 4,909,549 A * | 3/1990 | Poole et al. | 280/738 |
| 4,981,655 A * | 1/1991 | Kolbe et al. | 422/165 |
| 5,298,187 A | 3/1994 | Zhang et al. | 282/187.31 |
| 5,868,424 A * | 2/1999 | Hamilton et al. | 280/741 |
| 6,352,652 B2 * | 3/2002 | Zhang et al. | 252/187.31 |

OTHER PUBLICATIONS

Borochkin, V.P., et al., Production of Cold Gases, XP-002140541.

\* cited by examiner

COOL OXYGEN CHEMICAL GAS GENERATOR

This patent application claims the benefit of priority from PCT application Ser. No. PCT/NL02/00506 filed Jul. 25, 2002, the contents of which are incorporated herein by reference.

FIELD OF THE INVENTION

This invention relates to a chemical oxygen gas generator.

BACKGROUND OF THE INVENTION

Chemical oxygen (pyrotechnic) gas generators have been developed and used already for long periods. Self-controlled, continuously ready to operate for many years without any verification tests, easy activation from low-power electric sources, small size, safe, a rather high yield of oxygen on a per-unit volume and unit mass and a number of other advantages make them irreplaceable in case of emergencies and in accidents. They are used and applied, for instance, for the emergency supply of oxygen to the passengers in aircraft in case of cabin depressurization, in submarines if the other emergency oxygen supply systems fail, in space stations in case of emergency if the basic oxygen supply systems fail, and in many other conceivable emergency cases. A typical example of the use of oxygen generators on-board aircraft is presented in U.S. Pat. No. 4,840,171.

An operational application is the supply of oxygen for firefighters. Other cases to provide oxygen to satisfy operational requirements are e.g. for divers, or for driving rocket engines on-board spacecraft. In all these cases oxygen has to be provided independently of the ambient or surroundings.

In general, oxygen may be provided from oxygen stored in bottles or from oxygen generators. The latter in many cases are lighter and less voluminous for the same amount of oxygen than bottles. Chemical oxygen generators are the subject of this invention. Chemical oxygen generators are well known to those versed in the art. As a rule, chemical compounds, which release oxygen during thermal decomposition, are used in chemical oxygen generators. The following compounds are commonly used:

Alkali metal chlorates and alkali metal perchlorates, especially Lithium perchlorate ($LiClO_4$), Lithium chlorate ($LiClO_3$), Sodium perchlorate ($NaClO_4$), Sodium chlorate ($NaClO_3$), Potassium perchlorate ($KClO_4$) or Potassium chlorate ($KClO_3$);

Peroxides, especially Sodium peroxide ($Na_2O_2$) and Potassium peroxide ($K_2O_2$)

Superoxides, especially Potassium superoxide ($KO_2$) and Sodium superoxide ($NaO_2$)

Special additives are used in small amounts to assure self-sustained decomposition (combustion) while releasing oxygen. These additives also control the reaction rate, and form a heat resistant slag with a high-melting point and scavenge harmful gases (i.e. impurities, e.g. chlorine, its compounds and others) that may be released by side reactions.

Typical Examples of These Additives Are:

Metals: Aluminum, Magnesium, Zinc, Manganese, Molybdenum, Cobalt, Nickel, and in particular Iron;

Cobalt oxides ($Co_2O_3$ and $Co_3O_4$), Chromium oxide ($Cr_2O_3$), Copper oxide (CuO), Iron oxide ($Fe_2O_3$), Zinc oxide (ZnO), Manganese oxide (MnO), Manganese dioxide ($MnO_2$), Magnesium oxide, (MgO), Silicium dioxide ($SiO_2$)

Alkali peroxides, specifically Sodium peroxide ($Na_2O_2$), Potassium peroxide ($K_2O_2$), Barium peroxide ($BaO_2$)

Alkali super-oxides, specifically Sodium superoxide ($NaO_2$) and Potassium superoxide ($KO_2$)

U.S. Pat. No. 6,126,854 mentions a number of combinations and specifically mentions magnesium oxide to control the decomposition reaction, suppress chlorine formation, improve the rheology and facilitate the mixing. One reason for improving the rheology and the mixing, is the way in which the oxygen candle according to U.S. Pat. No. 6,126,854 has been made. The present invention avoids several of these difficulties. U.S. Pat. No. 3,868,225 discusses another oxygen generator (or oxygen candle). Materials, like asbestos, which are presently considered a health hazard, are used in this patent to obtain oxygen of breathing quality. The cool oxygen gas generator which is subject of this invention does not use asbestos.

U.S. Pat. Nos. 5,336,470 and 5,322,669 discuss means to control the mass flow rate of the oxygen. This is done by introducing barriers of various shapes. These barriers on one hand create a specific path for the decomposition front, but also specifically serve to absorb heat from the decomposition reaction. This is certainly required if the chemical oxygen generator has to provide oxygen for breathing purposes. For example, the decomposition of sodium chlorate is according to the reaction:

$$2NaClO_3 \rightarrow 2NaCl + 3O_2 + 101 \text{ kJ}$$

To maintain the decomposition reaction, fuel like iron (Fe) is added to the mixture. The decomposition temperature of the mixture is in the order of 1500 K. In a classical chemical oxygen generator heat is absorbed by the additives and the housing, but insulation material is required to prevent the outside of the housing becoming too hot and additional heat sinks to cool the oxygen to acceptable temperatures. U.S. Pat. No. 3,868,225 uses glass fiber as insulating material and a double wall through which coolant air may pass. Nevertheless, oxygen temperatures of 370° C. (700° F.) are reported. It is obvious that if the oxygen is to be used directly for breathing, it must be cooled down further, which usually is done by large heat capacity filters. These serve the purpose of filtering the oxygen gas from particulate material and polluting chemicals, if present, but especially to cool the oxygen. Therefore, these filters are much larger and heavier than would be the case if the only purpose was to filter and cleanse the oxygen. In fact, the filters are counterproductive for mass and volume reduction. The importance of low mass is specifically stressed in U.S. Pat. No. 6,007,736.

The present invention circumvents the problems of the prior art, by making use of a technology that has been described in the Russian patent 2108282 and the International patent application PCT/NL00/00696, publication Number WO 0123327. Here the hot decomposition gas is passed through the not reacted material, thereby raising the temperature of the virgin material and cooling the produced gas. However, to accomplish this it is necessary to make a porous charge that remains integer during the decomposition when oxygen is released. If that were not the case, particulate material might clog the porous charge and functioning of the gas generator would be impaired. U.S. Pat. No. 4,981,655 teaches a chemical oxygen generator where also the hot oxygen passes through the virgin material. However, this virgin material consists of loose pellets held together and compressed by a spring load. The pellets themselves are specially manufactured and consist of a cylindrical center body and two hemispherical end caps. The cylindrical part can even be of a different chemical composition than the hemispherical end caps. Although the dimensions of the pellets are not given in U.S. Pat. No. 4,981,655, it can be inferred from the drawings that they are of macroscopic dimensions; therefore the specific surface area for contact with the hot oxygen is much smaller than the specific surface of the porous virgin material that is subject of the present invention.

SUMMARY OF THE INVENTION

The object of the invention is a chemical gas generator providing oxygen of low temperature, such as below 50° C., preferably below 30° C., preferably also of very high purity. The main object of the invention is a special oxygen-generating material and the technology of manufacturing the porous, gas-permeable, mechanically strong charges of this material. When receiving a defined amount of (externally provided) heat, these charges are able to decompose exothermally (burn) while generating oxygen. They are also capable to pass hot oxygen through their own body without destruction or volumetric burning. The charge is placed in the gas generator in such a way that the oxygen generated in the reaction passes through the porous virgin charge in the same direction as the reaction front under a pressure difference. Because of this process, the oxygen is cooled down to the ambient temperature due to heat exchange with the charge. At the same time, the oxygen heats the charge near the reaction front up to the temperature required to sustain this reaction.

The slag formed after the reaction consists of substances with high melting and boiling points and remains within the gas generator.

To achieve an efficient exchange of heat and an unobstructed path for the oxygen, the charge has a porosity ($\epsilon_p$) ranging from 41% to 61% and a relatively large specific surface $S_{pc}=(13\pm2)\cdot 10^8$ m²/kg. (The porosity is defined as $\epsilon_p=1-\rho_{ch}/\rho_c$, where $\rho_{ch}$ is the charge density and $\rho_c$ is a charge composition density).

The charge is composed of fine-granules as an oxygen source; the main ingredients are compounds from the groups:

chlorates and perchlorates of alkali metals, particularly Lithium perchlorate ($LiClO_4$), Lithium chlorate ($LiClO_3$), Sodium perchlorate ($NaClO_4$), Sodium chlorate ($NaClO_3$), Potassium perchlorate ($KClO_4$) or Potassium chlorate ($KClO_3$);

peroxides, particularly Sodium peroxide ($Na_2O_2$) and Potassium peroxide ($K_2O_2$);

Superoxides, particularly Potassium superoxide ($KO_2$) and Sodium superoxide ($NaO_2$).

Small amounts of special substances are introduced into the charge composition to:

provide a self-sustaining decomposition (combustion) generating oxygen, control the reaction rate, form a heat-proof slag with a high-melting and –boiling point, and scavenge harmful contaminants (e.g. chlorine and its compounds) which may appear in small amount as a result of side reactions.

These substances are selected from the following groups:

metals: Aluminum (Al), Magnesium (Mg), Zinc (Zn), Manganese (Mn), Molybdenum (Mo), Cobalt (Co), Nickel (Ni), Particularly Iron (Fe);

Oxides: Cobalt oxides ($Co_2O_3$ and $Co_3O_4$), Chrome oxide ($Cr_2O_3$), Copper oxide (CuO), Iron oxide ($Fe_2O_3$), Zinc oxide (ZnO), Manganese oxide (MnO), Manganese dioxide ($MnO_2$), Silicium dioxide ($SiO_2$), Magnesium oxide (MgO);

alkali and alkaline-earth metal peroxides: particularly sodium peroxide ($Na_2O_2$), Potassium peroxide ($K_2O_2$) and Barium peroxide ($BaO_2$);

superoxides: particularly Sodium superoxide ($NaO_2$) and Potassium superoxide ($KO_2$).

To achieve the proper burning and cooling characteristics, it is preferred that the porous material has a very high specific surface. It is important that at the substantial porosity and relatively high specific surface of the pores, a rather high charge strength is assured (the minimum compression strength is at least 0.67 MPa and the modulus of elasticity is over 50 MPa). These mechanical characteristics assure when assembling, operating and transporting the gas generator, that the charge does not deform, remains integer and doesn't crack or crumble.

The selection and amount of special binder material and the process of charge manufacturing is an important aspect of this invention. It is an aspect of the invention that the amount of binder material is less than 3.0 wt. % of the charge, thereby assuring a high purity, while at the same time maintaining sufficient porosity. It provides a sufficient level of mechanical properties at a substantial porosity of the charge with a very small amount of binder in the composition. The binder is selected from the following group:

Inorganic binders: particularly Sodium silicate ($Na_2SiO_3$) or Potassium silicate ($K_2SiO_3$) or a mixture thereof Organic binders:, particularly Sodium polyvinyl tetrazole ($C_3H_3N_4Na)_m$. or, alternatively:

Nitrocellulose, a mixture of pentaphtalic anhydride and pentaerythrite, epoxy resins, or water soluble proteins.

In case organic binders are used, and this is preferred, the amount thereof is preferably less than 1.5 wt. %.

According to the method to generate cool gases (Russian Patent No2108282) the charge design and its arrangement in the generator must create a decomposition front and ensure that the generated oxygen flows through the charge in the direction: from the igniter to the vent. In relation to this, the design and shape of the charge are limited only by the fact they must provide a suitable propagation of decomposition front and oxygen flow through the charge.

Vibration-tamping the granular mass into a processing die is used to manufacture the porous charges. This technology involves the following main stages:

preparation of ingredients, mixing of dry powdered ingredients, mixing of the mass, granulation of the mass, molding of the granular mass and solidification of a charge.

Preparation of the solid ingredients involves:

drying, grinding, and sieving or screening, to separate particle fractions of defined sizes.

Preparation of the Binder Involves:

mixing of a solution of the binder in a defined concentration in an intermediate processing solvent, mixing of the powdered ingredients in the required ratio until a homogeneous mass is obtained.

Mixing of the mass involves the following: thorough agitation of the binder solution (or parts of it) and mixing of the dry powdered ingredients in the required ratios.

Granulation comprises manufacturing of solid granules of defined sizes from the obtained mass such that it guarantees the required porosity and specific surface area of the charge pores. The granules are moistened with the binder solution in the intermediate processing solvent or directly with the intermediate processing solvent and are molded by vibration tamping into a processing die of the required dimensions and shape. Vibration tamping is carried out to provide homogenous density, porosity and strength of the complete charge. The charge, cast into a processing die, is subjected to solidification.

One part of the invention is that the housing of the gas generator has one or more filters. These filters are installed between the charge and the vent of the gas generator. The filters have the following objectives:
  they catch slag particles, which may be carried with the oxygen flow;
  they scavenge other gas impurities that contaminate the oxygen, and that were not scavenged by the special additives in the charge;
  they catalytically convert contaminating compounds in less harmful compounds, e.g conversion of CO in $CO_2$
  they cool the oxygen flow towards the end of reaction, when the last small part of the charge is heated and may have insufficient heat capacity to cool this final flow of oxygen down to the required temperature.

Another part of this invention is a thermal protection on the oxygen generator housing to prevent heating of its outer surface during the burning of a charge.

This thermal protection may be applied on the inner side or the outer side of the housing or on both sides.

The inner thermal protection may be made of glass or silicon fibers impregnated with the same binder as used in charge.

Alternatively, the housing itself, if that is made of composite and low heat-conducting material, may serve as a thermal protection material.

If there is no thermal protection on the housing, the outer side of the charge may be provided with a thermal protection, or the outside surface of the charge itself may serve as thermal insulation. The outside of charge with a thickness ~1.5 mm adjacent to the wall of the housing will not burn due to cooling by the wall and then serves as a thermal insulator.

All these approaches may also be used in combination.

DETAILED DESCRIPTION OF THE PREFERRED EMBODIMENTS OF THE INVENTION

Figure 1:
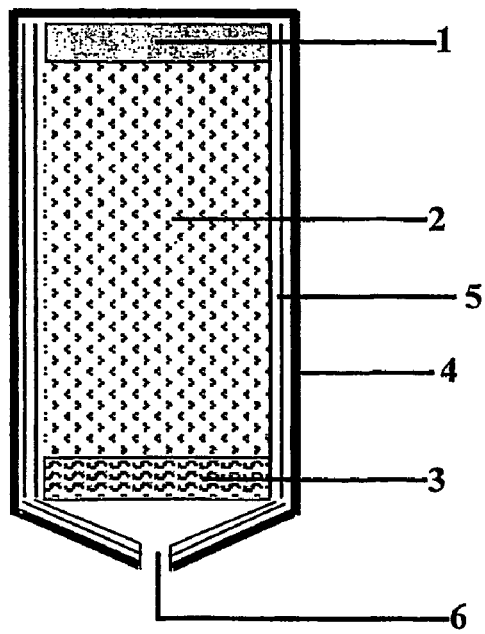
FIG. 1 is the schematic of the cold oxygen generator, consisting of an igniter (1), a porous oxygen generating charge (2), one or more filters (3); these filters (3) are optional; the housing (4), the (optional) thermal protection (5); this thermal protection may also be formed by the charge itself; and the vent or exit (6).

The chemical cool oxygen generator (FIG. 1) includes a housing, 4, wherein a porous charge, 2, made of the oxygen generating material is mounted. The self-sustaining decomposition (combustion) of the charge, 2, is initiated by means of the igniter, 1. The reaction starts on the charge surface adjacent to the igniter and the reaction front runs through the charge body to the opposite end in direction to the vent, 6. Under the pressure difference the oxygen generated as a result of the reaction passes through the body of the virgin porous charge, is cooled there and passes through vent, 6, to the user, or to a storage bottle.

In one of the preferred embodiments, the housing is protected from the heat of the decomposing charge by a thermal protection 5, preferably made from silica or glass fiber impregnated with the same binder as used for the charge 2. In another preferred embodiment, the charge 2 itself provides the thermal protection of the housing. In this case a layer of ~1.5 mm thickness adjacent to the wall of the housing does not burn due to cooling of the outside of the charge by the wall of the housing, 4.

In the preferred embodiment, the housing, 4, is made of metal such as steel, aluminum or titanium. In another preferred embodiment, the housing, 4, is made of a composite material (plastic composite).

Between the charge, 2, and the vent, 6, a filter, 3, is installed. The given filter serves:
  to prevent any particles to be carried away with oxygen, 11;
  to scavenge any chemical impurity that has not been removed during the reaction by the charge composition;
  to convert any CO present in the gases into $CO_2$ by a catalytic action
  to cool the last portion of the oxygen, 11, that may be of a slightly higher temperature than the oxygen during the major period of the burning.

Filter, 3, can consist of four separate filters: the first is for preventing carrying particles away with the oxygen, 11, the second is for removing harmful gaseous impurities, the third is for converting any CO into $CO_2$, the fourth filter is for additional oxygen cooling.

Sand can be a material of the filter to cool the very last portion of the oxygen, 11. In a second preferred embodiment, all the filter functions are combined in two or three separate filters, 3. In another preferred embodiment, the various filter functions are combined in one filter, 3.

In other preferred embodiment the number of filters is reduced, as in many cases no filters or only specific filters are required. If no additional cooling is required, the sand filter is omitted.

In another preferred embodiments, the sand filter combines the functions of cooling and preventing any particle matter to be expelled with the oxygen.

The housing, 4, in a preferred embodiment has handles or grips for easy transportation. In another preferred embodiment, the housing, 4, has attachment fixtures, that provide easy mounting of the oxygen generator in different devices. Such fixtures encompass threaded ends, flanges, screw connections or other standard connections that are known in the field.

Figure 2:
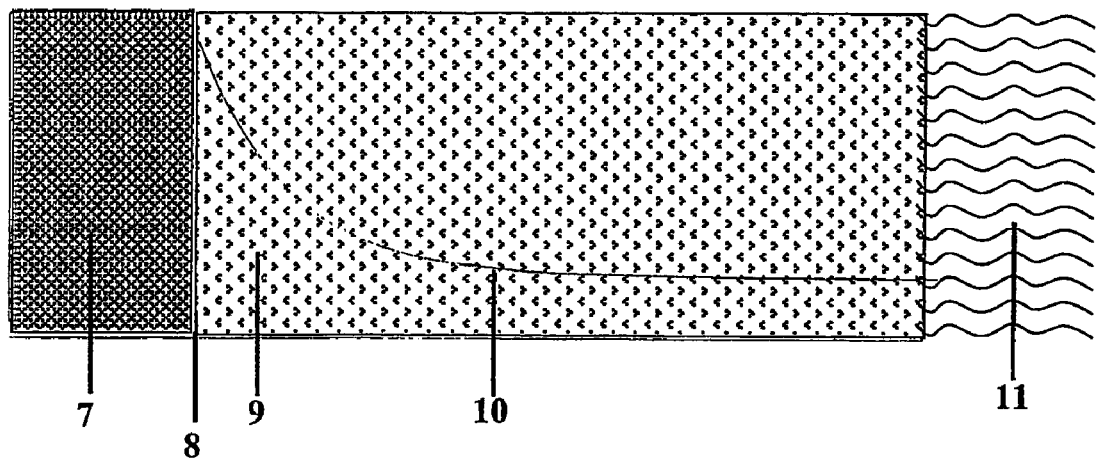
FIG. 2 is a schematic of the burning porous charge: a decomposed part of the charge (7) is at the left-hand-side; the decomposition front (8) separates the decomposed part of the charge and the virgin charge material (9). The temperature profile (10) in the charge has been schematically indicated and the temperature rapidly drops from the decomposition temperature of 1500 K to ambient temperature. Oxygen (11) flows from the decomposition front (8) to the right through the porous charge and leaves the porous charge at the right hand side.

FIG. 2 is a schematic of the charge during quasi steady state burning. At the left, there is a decomposed part of the charge, 7, (slag). The decomposition front, 8, moves from left to right. The decomposition temperature does not exceed 1500 K. The released oxygen, 11, passes through the virgin porous charge, 9, under the pressure difference, thereby raising the temperature, 10, of the virgin charge and reducing the oxygen temperature. At a short distance behind the decomposition front (about 5-10 mm), the temperature drops to a value close to the initial charge temperature. The oxygen flow leaves the charge at the right-hand-side. The temperature profile, 10, as a function of distance of the charge length is shown schematically.

In the preferred embodiment, the oxygen releasing composition involves chemicals selected from the following list as oxygen sources:

Lithium perchlorate ($LiClO_4$),
Lithium chlorate ($LiClO_3$),
Sodium perchlorate ($NaClO_4$),
Sodium chlorate ($NaClO_3$),
Potassium perchlorate ($KClO_4$),
Potassium chlorate ($KClO_3$),
Sodium peroxide ($Na_2O_2$),
Potassium peroxide ($K_2O_2$),
Sodium superoxide ($NaO_2$),
Potassium superoxide ($KO_2$).

The chemicals from the following list are added in small proportion (up to 5%) to the composition to maintain the self-sustaining decomposition of the oxygen releasing material, to control the reaction rate, to form a slag with a high melting point, and to remove impurities (i.e. harmful gases) that can be formed as a result of side reactions:

Metals:
    Aluminium (Al), Magnesium (Mg), Zinc (Zn), Manganese (Mn), Molybdenum (Mo), Cobalt (Co), Nickel (Ni), and especially Iron (Fe)

Compounds (Oxides):
    Barium peroxide ($BaO_2$),
    Cobalt oxides ($Co_2O_3$ or $Co_3O_4$),
    Chromium oxide ($Cr_2O_3$),
    Copper oxide (CuO),
    Iron oxide ($Fe_2O_3$),
    Silicium dioxide ($SiO_2$),
    Zinc oxide (ZnO),
    Manganese oxide (MnO),
    Manganese dioxide ($MnO_2$),
    Sodium peroxide ($Na_2O_2$),
    Potassium peroxide ($K_2O_2$),
    Sodium superoxide ($NaO_2$),
    Potassium superoxide ($KO_2$).

The binder for the oxygen generating composition is selected from the following group of materials:
    Inorganic adhesives, especially, Sodium silicate ($Na_2SiO_3$), or Potassium silicate ($K_2SiO_3$) or a mixture thereof.
    organic adhesives or lacquers, especially the Sodium salt polyvinyl tetrazole $(C_3H_3N_4Na)_m$
    Nitrocellulose, a mixture of pentaphtalic anhydride and pentaerythrite, epoxy resins, or water soluble proteins.

In the preferred embodiment, the porous charge of oxygen generating composition has a specific surface area of $11 \cdot 10^8 - 15 \cdot 10^8$ $m^2/kg$, a porosity within the range from 41% to 61%, a compression strength over 0.67 MPa, a modulus of elasticity more than 50 MPa and a density between 1020 to 1150 $kg/m^3$.

In the first preferred embodiment, the charge has the following composition:

| | |
|---|---|
| $NaClO_3$ | 87.5% (weight) |
| $BaO_2$ | 3.5% (weight) |
| Fe | 4.0% (weight) |
| $MnO_2$ | 3.5% (weight) |
| $(C_3H_3N_4Na)_m$ | 1.5% (weight) |

The measured characteristics of the decomposition products (without a filter) are:
Composition of the Gas:

| | |
|---|---|
| $O_2$ | 95.4% (volume) |
| $CO_2$ | 0.92% (volume) |
| $N_2$ | 2.10% (volume) |
| $H_2O$ | 1.58% (volume) |

The gas temperature (at the exit of the gas generator) is 293.degree K (20.degree.C.).

In the second preferred embodiment, the charge has the following composition:

| | |
|---|---|
| $NaClO_3$ | 87.5% (weight) |
| $BaO_2$ | 3.5 (weight) |
| Fe | 4% (weight) |
| $Co_3O_4$ | 3.5% (weight) |
| $(C_3H_3N_4Na)_m$ | 1.5% (weight) |

The measured characteristics of the decomposition products (without a filter) are:
Composition of the Gas:

| | |
|---|---|
| $O_2$ | 95.35% (volume) |
| $CO_2$ | 0.93% (volume) |
| $N_2$ | 2.12% (volume) |
| $H_2O$ | 1.60% (volume) |

The gas temperature (at the exit of the gas-generator) is 293.degree K (20.degree.C.).

The technology of vibration-tamping the granular mass of the oxygen generating composition in a processing die is used to manufacture porous charges. The technology involves the following main stages: preparation of ingredients, mixing of the mass, granulation of the mass, molding the granular mass and solidification of the charge.

The preparation of solid ingredients involves drying, grinding and separation to separate out fractions with particles of specific sizes. Subsequently, the powdered ingredients are agitated in the required ratio until a homogeneous mixture is obtained.

The mixing of the mass is obtained by agitation of the binder (or a part of it) with the dry powdered ingredients and an intermediate solvent in the required ratio.

Granulation involves the manufacturing of solid grains from the obtained mixture with well-defined sizes, that guarantees the required porosity and specific surface area of the pores in the charge. The grains are moistened with a mixture consisting of a part of the binder and the intermediate processing solvent, or they are only moistened with processing solvent. They are molded by vibration-tamping into a processing die of the required dimensions and shape of the charge. Vibration-tamping is carried out to provide a homogenous density, porosity, and strength through the complete body of the charge. After this, the charge in the processing die is left to harden at the appropriate solidification temperatures.

After solidification the charge is removed from the processing die and placed in the housing of a chemical gas generator. In some cases, the processing die itself can be a part of the generator housing and after the solidification, the charge can be connected with the other generator elements.

In accordance with the method to generate cool gases by decomposition in porous charges, according to the Russian Patent No2108282, the design of a charge and its installation in the gas generator provides a proper propagation of the decomposition front and oxygen flow through the porous-charge body.

It is understood that the foregoing description is that of the preferred embodiments of the invention and that various changes and modifications may be made thereto without departing from the spirit and scope of the invention as defined in the appended claims.

The invention claimed is:

1. A chemical oxygen generator to produce cool oxygen gas comprising:
   a. a charge housing
   b. a solidified charge having pores contained in the said housing, the charge being made of a homogenous chemical mixture that generates oxygen upon decomposition and that will undergo a self-sustained exothermal decomposition after initiation, the said charge containing at most 3.0 wt. % of an inorganic binder material selected from the group consisting of sodium silicate, potassium silicate, and a mixture thereof, where the said charge is made from granular material bonded together by said binder material and having a porosity between 41% and 61%, and wherein the charge has a compression strength larger than 0.67 MPa and a Modulus of Elasticity under compression larger than 50 MPa,
   the said charge allows the generated oxygen to pass through the charge without damaging a virgin material and without creating volumetric burning,
   the said charge is mounted in the housing in such a way that the generated oxygen passes through the charge and under the pressure difference flows from a moving decomposition front towards the vent, and is cooled down to the ambient temperature due to heat exchange with the charge;
   c. an ignition device mounted at one end of the cartridge in such a way that it is capable to initiate a self-sustained decomposition of the charge at the charge surface adjacent to the initiator,
   d. an inert porous mass filter to remove sufficient heat from the oxygen towards the end of the reaction to provide oxygen gas less than 50° C., and
   e. a vent for discharging the generated oxygen that has passed through the generating-porous charge and filter;
   f. wherein the temperature of the vented oxygen gas is less than 50° C. substantially throughout the entire use of the generator.

2. A chemical oxygen generator according to claim 1 with
   a. an inert porous mass (filter) to cool the oxygen towards the end of burning.
   b. a filter to prevent particulate matter to be expelled from the said cartridge,
   c. a filter containing a catalyst that converts any CO present in the decomposition gases into $CO_2$,
   d. a filter to prevent polluting chemicals to be expelled from the said cartridge.

3. A chemical oxygen generator according to claim 2 where two or more of the filters mentioned under 2a, 2b, 2c, and 2d are combined.

4. A chemical oxygen generator according to claim 1, wherein the binder is present in an amount of 1.5 wt. % or less.

5. A chemical oxygen generator according claim 1, where the oxygen generating chemical is from the group of alkali chlorates of perchlorates, more specifically Lithium perchlorate ($LiClO_4$), Lithium chlorate ($LiClO_3$), Sodium perchlorate ($NaClO_4$), Sodium chlorate ($NaClO_3$), Potassium perchlorate ($KClO_4$) or Potassium chlorate ($KClO_3$) and preferably Sodium chlorate ($NaClO_3$), or from the group of alkali peroxides and superoxides, specifically sodium peroxide ($Na_2O_2$), potassium peroxide ($K_2O_2$), specifically sodium superoxide ($NaO_2$), potassium superoxide ($KO_2$), additives selected from the group Aluminium (Al), Magnesium (Mg), Zinc (Zn), Molybdenum (Mo), Manganese (Mn), Cobalt (Co), Nickel (Ni), Iron (Fe), Barium peroxide ($BaO_2$), Cobalt oxides ($Co_2O_3$ and $Co_3O_4$), Chromium oxide ($Cr_2O_3$), Copper oxide (CuO), Iron oxide ($Fe_2O_3$), Silicium dioxide ($SiO_2$), Zinc oxide (ZnO), Manganese Oxide (MnO) and Manganese Dioxide ($MnO_2$), or from the group of alkali peroxides, specifically sodium peroxide ($Na_2O_2$), potassium peroxide ($K_2O_2$), and alkali superoxides specifically sodium superoxide ($NaO_2$), potassium superoxide ($KO_2$) and as binder material from agents from the group of inorganic adhesives, specifically: $Na_2SiO_3$, $K_2SiO_3$, or mixtures thereof.

6. A chemical oxygen generator according to claim 1 that is made with the vibration-tamping technology to load a granular mass into a processing die involving the following main stages:
   preparation of solid ingredients: comprising drying, grinding and separation into the required fractions; preparation of binder solutions of the required concentrations with an intermediate processing solvent;
   mixing of the dry powdered ingredients in the required ratio until a homogeneous mixture is obtained;
   mixing the mixture of dry powdered ingredients with the binder (or a part of it) and the intermediate processing solvent in the required ratio;
   manufacturing grains of defined sizes with the mixture of the binder and powered ingredients;
   molding grains moistened with a mixture comprising a part of binder and processing solvent in the required ratio by vibration-tamping into a processing die;
   solidification of the molded charge.

7. A chemical oxygen generator according to claim 1 where the tooling to cast the charge in is part of the housing of the gas generator.

8. A chemical oxygen generator according to claim 1, where the composition is Sodium chlorate >80%, Barium peroxide >2%, Iron powder >3%, Cobalt oxide ($Co_3O_4$) <5%, Manganese dioxide <5% and an inorganic binder <3%.

9. A chemical oxygen generator according to claim 1, where the velocity of the decomposition reaction is determined by the composition of the charge and in particular by the amount and kind of additives.

10. A chemical oxygen generator according to claim 1, where the particle size of the granular ingredients has been selected such that a porosity between 41% and 61% is obtained.

11. A chemical oxygen generator according to claim 1 where the particle size of the granular ingredients has been selected such that the charge density is between 1000 kg/m$^3$ and 1150 kg/m$^3$.

12. A chemical oxygen generator according to claim 1 where the composition of the charge and the granular properties of the ingredients is such that the velocity of the decomposition front lies between 0.2 and 0.3 mm/s.

13. A chemical oxygen generator according to claim 1 where the filter to cool the oxygen gas towards the end of burning consists of sand.

14. A housing according to the claim 13, where the said housing has fixtures allowing the housing to be mounted in devices or to attach the housing to equipment or walls.

15. A housing according to the claim 13 where the said housing has fixtures allowing the housing to be carried and transported.

16. A chemical oxygen generator according to claim 1, where the housing has been made from metal.

17. A housing for a chemical oxygen generator according to claim 1, where the metal is aluminium, titanium or steel.

18. A chemical oxygen generator according to claim 1, where the housing has been made from plastic composite material.

19. A chemical oxygen generator according to claim 1, where the housing, via the vent or exit is connected to a buffer or storage vessel.

20. A chemical oxygen generator according to claim 1, where the outer layer of the charge acts as a thermal insulator.

21. A chemical oxygen generator according to claim 1, where thermal protection material has been placed between the charge and the wall of the housing.

22. A chemical oxygen generator according to claim 21 where the thermal protection material consists of glass fiber impregnated with the same binder as used in the charge.

23. A chemical oxygen generator according to claim 21 where the thermal protection material consists of silica fiber impregnated with the same binder as used in the charge.

24. A chemical oxygen generator according to claim 1 where the solidified charge having pores is molded and remains integer.

* * * * *

UNITED STATES PATENT AND TRADEMARK OFFICE
CERTIFICATE OF CORRECTION

PATENT NO. : 8,142,726 B2
APPLICATION NO. : 10/485033
DATED : March 27, 2012
INVENTOR(S) : Alexandr Sergeevich Zharkov et al.

It is certified that error appears in the above-identified patent and that said Letters Patent is hereby corrected as shown below:

Item (73) on the cover page of the patent should read:

(73) Assignee: Nederlandse Organisatie Voor
Toegepast-Natuurwetenschappelijk
Onderzoek Tno, Delft (NL)

Signed and Sealed this
Eleventh Day of September, 2012

David J. Kappos
*Director of the United States Patent and Trademark Office*